United States Patent
Hymel

(10) Patent No.: US 8,688,793 B2
(45) Date of Patent: Apr. 1, 2014

(54) SYSTEM AND METHOD FOR INSERTION OF ADDRESSES IN ELECTRONIC MESSAGES

(75) Inventor: James Allen Hymel, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 233 days.

(21) Appl. No.: 13/291,153

(22) Filed: Nov. 8, 2011

(65) Prior Publication Data

US 2013/0117383 A1 May 9, 2013

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 5,909,679 A | 6/1999 | Hall | |
| 6,810,394 B2 | 10/2004 | Coutts et al. | |
| 6,901,394 B2 | 5/2005 | Chauhan et al. | |
| 7,051,075 B1 * | 5/2006 | Machino et al. | 709/206 |
| 7,082,428 B1 | 7/2006 | Denny et al. | |
| 7,120,589 B1 | 10/2006 | Szabo et al. | |
| 7,143,091 B2 | 11/2006 | Charnock et al. | |
| 7,584,161 B2 | 9/2009 | Forbes et al. | |
| 8,103,726 B2 * | 1/2012 | Stoddard et al. | 709/206 |
| 8,112,529 B2 * | 2/2012 | van Den Oord et al. | 709/227 |
| 2002/0133550 A1 | 9/2002 | Mears et al. | |
| 2003/0028525 A1 | 2/2003 | Santos et al. | |
| 2003/0179876 A1 | 9/2003 | Fox et al. | |
| 2004/0083269 A1 | 4/2004 | Cummins | |
| 2005/0050547 A1 * | 3/2005 | Whittle et al. | 719/310 |
| 2005/0216489 A1 | 9/2005 | Young et al. | |
| 2005/0288949 A1 | 12/2005 | Holbrook | |
| 2005/0289168 A1 | 12/2005 | Green et al. | |
| 2006/0194185 A1 | 8/2006 | Goldberg et al. | |
| 2008/0021998 A1 | 1/2008 | Wentink | |
| 2008/0162640 A1 | 7/2008 | Boss et al. | |
| 2008/0270559 A1 | 10/2008 | Milosavljevic | |
| 2009/0119258 A1 | 5/2009 | Petty | |

(Continued)

FOREIGN PATENT DOCUMENTS

WO 2007139958 A2 12/2007

OTHER PUBLICATIONS

Autonomy Corporation plc, "Return on Investment from iManage Universal Search", Jan. 2010.

(Continued)

*Primary Examiner* — Jerry Dennison
(74) *Attorney, Agent, or Firm* — Jenna L. Wilson; Dimock Stratton LLP

(57) ABSTRACT

A system and method are provided for identifying suggested addressees of for messages being composed, based on keyword content of the composed message's subject line and/or message body. When a message is being composed at a messaging client, a request comprising at least a portion of the subject line or body is sent to a server or similar device. In response, the server provides an identification of possible addressees having a highest score associated with keywords identified in the transmitted portion. One or more of these addressees can be selected for inclusion in an address field of the composed message. Identification of the suggested addressees is based on a score assessed based on the number of forwarded messages received by those addressees containing those keywords, where repeated receipt of forwarded messages increases the addressee's score associated with those keywords.

18 Claims, 9 Drawing Sheets

(56) References Cited

U.S. PATENT DOCUMENTS

| | | | |
|---|---|---|---|
| 2010/0153324 A1 | 6/2010 | Downs et al. | |
| 2010/0169148 A1 | 7/2010 | Oberhofer et al. | |
| 2010/0228560 A1 | 9/2010 | Balasaygun et al. | |
| 2010/0332522 A1 | 12/2010 | Steidley | |
| 2011/0106966 A1* | 5/2011 | Smit | 709/231 |
| 2012/0284329 A1* | 11/2012 | van Den Oord et al. | 709/203 |
| 2013/0117383 A1* | 5/2013 | Hymel | 709/206 |

OTHER PUBLICATIONS

Autonomy Corporation plc, "iManage Universal Search—Autonomy Product Brief", Aug. 2010.

Leichtberg, "New in Labs: Got the wrong Bob?", Oct. 13, 2009, retrieved Mar. 8, 2011 from http://gmailblog.blogspot.com/2009/10/new-in-labs-got-wrong-bob.html.

Leichtberg, "New in Labs: Suggest more recipients", Apr. 17, 2009, retrieved Mar. 8, 2011 from http://gmailblog.blogspot.com/2009/04/new-in-labs-suggest-more-recipients.html.

Logan, "Identifying Subject Matter Experts: Knowledge Network Mapping", Jun. 2003, retrieved Mar. 8, 2011 from http://knetmap.knowinc.com/pdfs/Continuity_Planning_Govt_CASE%20STUDY.pdf.

Halverson et al. Behind the Help Desk: Evolution of a Knowledge Management System in a Large Organization (2004). In Proceedings of the ACM Conference on Computer-Supported Cooperative Work (CSCW)'04, Nov. 6-10, 2004, Chicago, IL, USA.

* cited by examiner

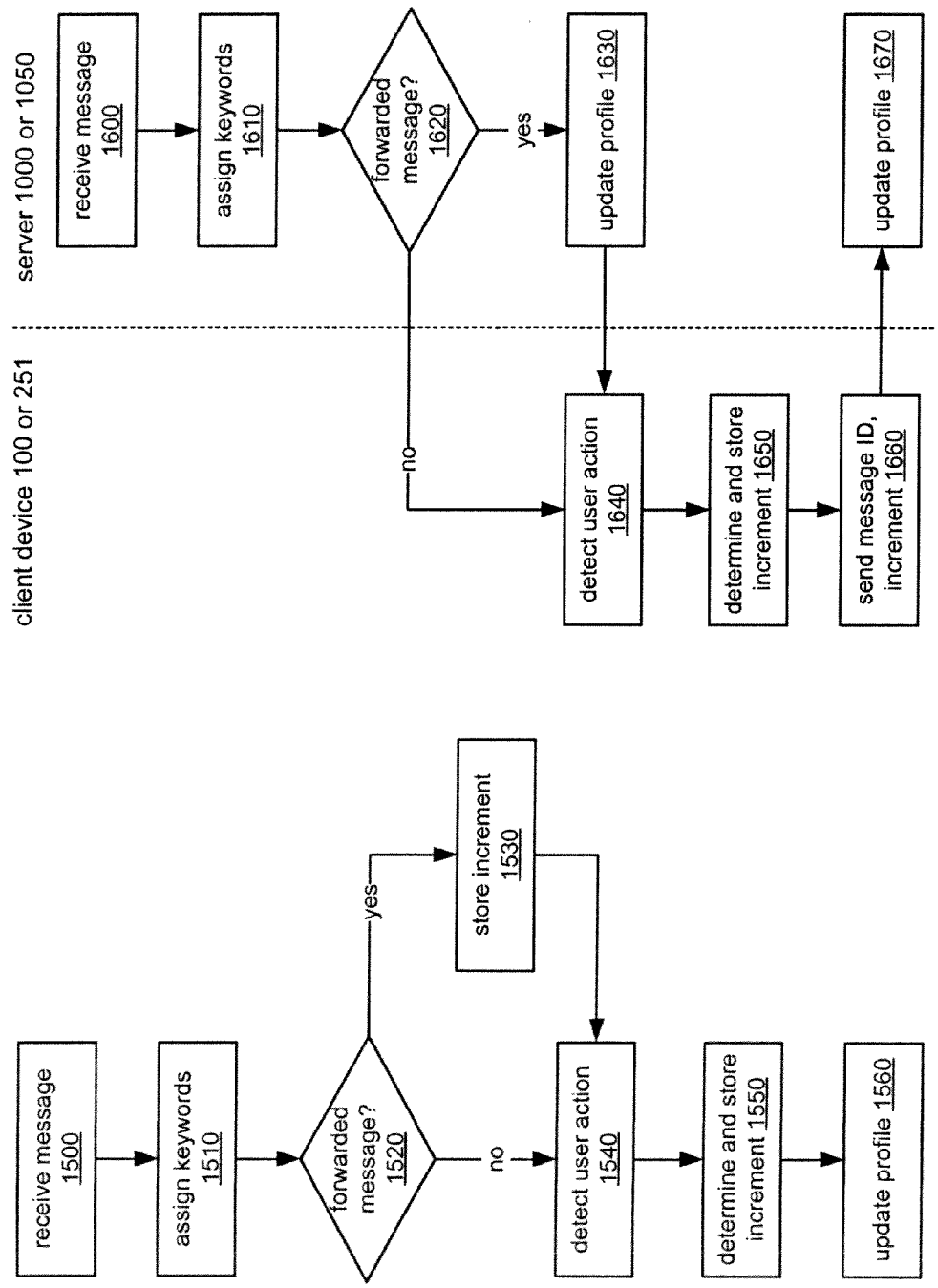

SYSTEM AND METHOD FOR INSERTION OF ADDRESSES IN ELECTRONIC MESSAGES

BACKGROUND

1. Technical Field

The present disclosure relates generally to the identification and insertion of address information in electronic messages.

2. Description of the Related Art

Within a single organization, there may be hundreds or thousands of members. Specific members of the organization may be "subject matter experts" who possess or have acquired particular subject matter expertise. Others within the organization may wish to contact one or more of these subject matter experts to avail themselves of the subject matter expert's expertise.

However, within the organization, and particularly when the organization is large, it is unlikely that any single given user will be personally acquainted with all organization members or the available suitable subject matter experts. Even with the availability of typical organizational messaging and directory systems, the user relying on these systems to seek out resources such as a subject matter expert is more likely to contact only those users within the first user's circle of personal contacts to determine whether one of those contacts can provide the needed information, or forward a message on to the target subject matter resource.

BRIEF DESCRIPTION OF THE DRAWINGS

In drawings which illustrate by way of example only embodiments of the present application.

FIG. 15 is a flowchart illustrating a process for updating subject matter profiles based on a user action.

FIG. 16 a flowchart illustrating a further process for updating subject matter profiles based on a user action.

DETAILED DESCRIPTION

The embodiments described herein therefore provide a system and methods for not only identifying possible subject matter experts based on message handling within an organization domain, but also for automated identification of addressees for insertion into a message for transmission by a messaging client.

The embodiments herein will be described and illustrated primarily in relation to message types such as email. However, it will be appreciated by those skilled in the art that these embodiments extend to other types and formats of messages, including without limitation instant messages (both server-based and peer-to-peer), SMS (Short Message Service), MMS (Multimedia Messaging Service), VVM (Visual Voicemail), voicemail, and the like. The formatting and transmission of all such messages, and the implementation of suitable messaging infrastructures to support such communications, will be known to those skilled in the art.

The embodiments herein are described in the context of an organizational structure and subject matter experts. However, it will be appreciated by those skilled in the art that this context is but one example, and the embodiments described herein may be applied to other contexts. In any given organization (such as a corporate, educational, or governmental organization, or other collectives of similarly associated individuals), an individual may have developed expertise or knowledge in particular subject matter (referred to herein as a "subject matter expert" or SME). An organization may include several such individuals, each having expertise or knowledge in the same or different disciplines, technologies, and the like. These individuals, ideally, are identified and accessible to others within the organization for subject matter consultation and guidance.

However, within the organization—and particularly in a large organization—the SMEs may not be personally known to all of the other individual organization members. An individual member may be acquainted with or personally have knowledge of only a subset of all organization members, and thus would likely only know of the subject matter expertise of that subset, if any. If this individual member then discovers that he or she requires the assistance of a SME in a particular field, he or she may not know precisely whom to contact. While the SME's contact information may be available in an organizational directory listing that is accessible to all organization members, this individual may not be able to identify from the directory listing that a given contact is the sought-after SME.

Figure 1:
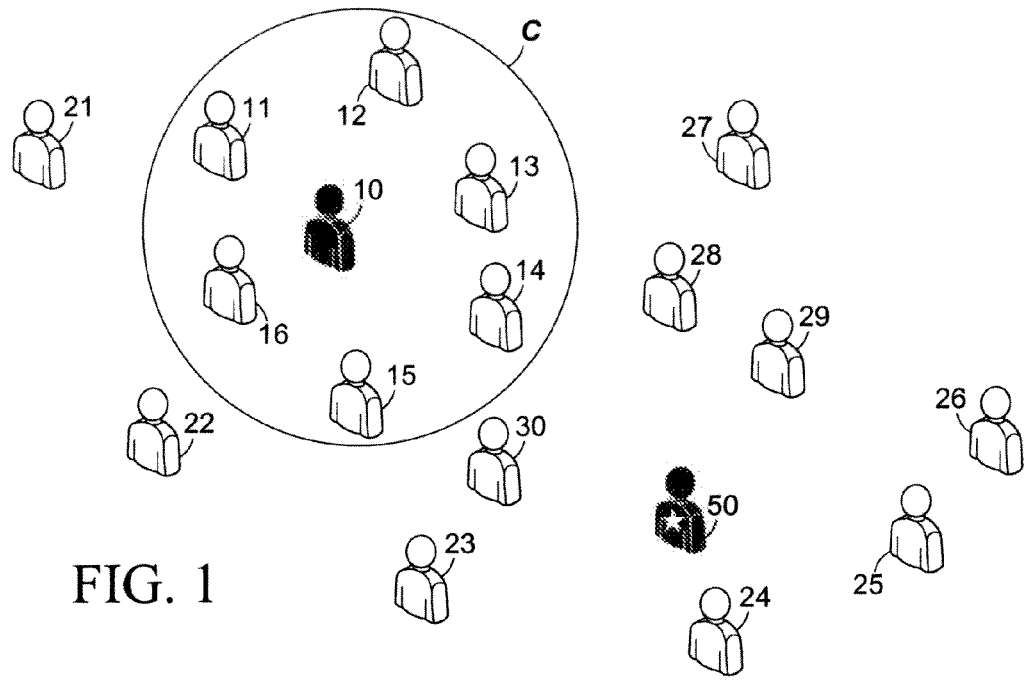
FIG. 1 is a schematic diagram illustrating a set of users within an organizational domain.

An example of this problem is illustrated in FIG. 1. A number of users 10 through 50 is illustrated, and is representative of set of users within a given organization that may be far greater than the number illustrated. Within the organization, the first user 10 may wish to locate and communicate with another member of the organization, who has particular subject matter expertise. This target user, the SME, is represented by user 50. The first user 10 may be capable of contacting any one of the other users 11 through 50 within the organization; however, his or her personal knowledge of the other users is limited to some or all of the subset of users 11, 12, 13, 14, 15 and 16. This subset may comprise those users with whom the first user 10 has had prior contact or a personal acquaintance, and is illustrated by the boundary C. The remaining users 21 through 50 are outside C, including user 50. The user 10 is therefore less likely to contact those users outside C simply because he or she is not sufficiently acquainted with them to determine that they are an appropriate contact person. Within an organization, of course, there may be multiple SMEs 50 having expertise in different areas, and multiple users 10 through 50 with defined circles of personal acquaintances; for example, user 14 in FIG. 1 may have an acquaintance or prior contact with users 10, 13, 15, 28 and 30, although this is not illustrated in FIG. 1.

The first user's personal acquaintance or prior contact with a second user is generally conceived as a social relationship based on the first user's knowledge of the second user and/or prior interaction between the first and second user. In the context of an organization's network resources, this relationship is manifested by data trails in the network resources. For example, if a first user and a second user have had prior contact using the organization's communication or collaborative resources, one or both of their respective data stores (e.g., message inboxes, phone call records, calendar entries) may reflect that contact through the presence of the second user's contact information (email address, telephone number, and so forth) in the first user's data, and vice versa.

Figure 2:
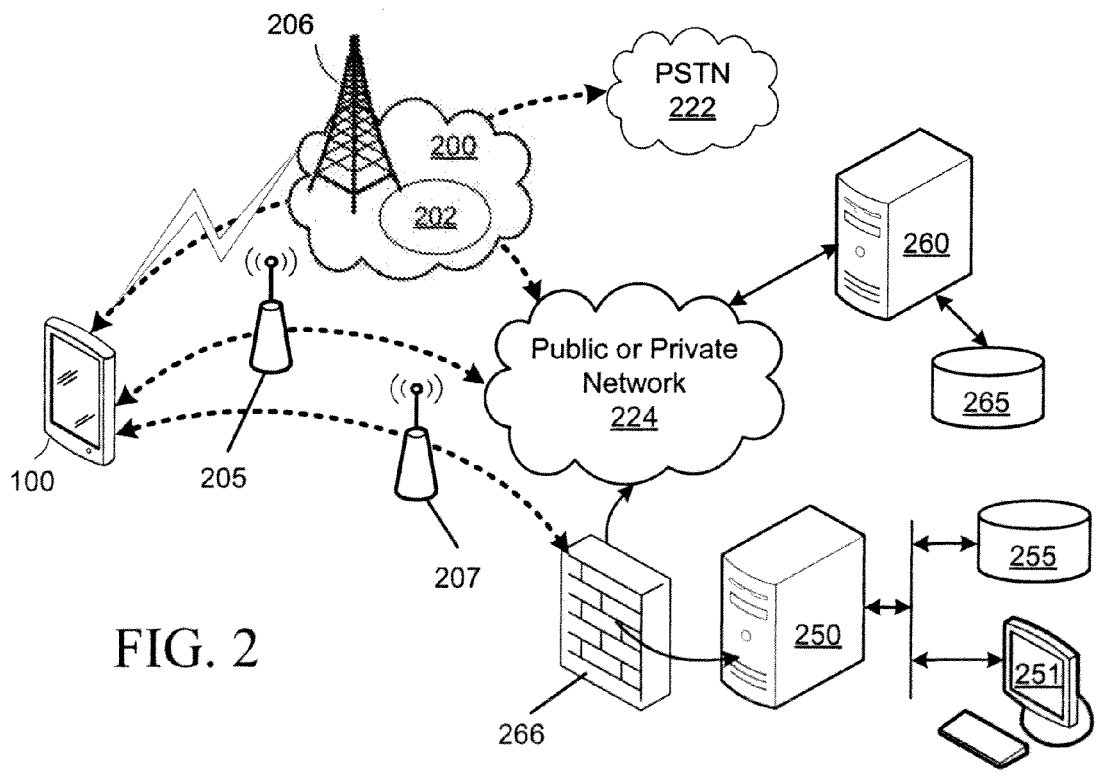
FIG. 2 is a schematic diagram illustrating a possible topology of a network serving the organizational domain.

An example of a possible network topology including select components of the organization's own network resources is illustrated in FIG. 2. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. The organization's host system can be an own-premises local area network (LAN), or wide area network in communication with LANs, with local computing resources such as one or more servers 250, one or more data repositories 255 and client devices 251 such as terminals or workstations. The servers 250 and data repositories 255 represent controllers, security and information technology policy modules, application servers, messaging servers, file servers, databases, memory devices and the like for providing services to the various users 10 through 50 via client devices, and as will be appreciated by those skilled in the art, include such components generally included in such electronic devices, such as communication subsystems for communicating over one or more fixed or wireless networks, one or more processors, data stores, disk arrays, and the like. The services can include but are not limited to messaging, directory services, collaborative applications, calendaring applications, search engines and file servers, and it will be appreciated by those skilled in the art that the various network components 250, 255, 251 will be adapted for use with those services.

Messaging services are implemented using one or more servers 250 provided with means for storing messages (e.g., a database or a suitable data repository 255) for each message service or format available over the organizational network, such as email, instant messaging, voicemail, and the like. The server 250 (or a plurality of such servers) and its corresponding data repository 255 can therefore store all received and sent messages on behalf of each user within the organization. In some embodiments, messages sent and received by a user may be stored only locally on the user's client device (e.g. a desktop computer or other personal computing device), while in other embodiments the messages are stored both locally at the client device as well as the server, in which case the message stores on the client device and the server are synchronized or reconciled periodically. The user device may be any suitable computing or communication device adapted for composition and transmission of messages.

The host system may operate from behind a firewall or proxy server 266, which provides a secure node and optionally a wireless internet gateway for the host system. Client devices such as mobile devices 100 can then access the host system wirelessly through the firewall or proxy server 266, as denoted by the access point 207. External access to the host system by mobile client devices 100 may also be provided via a public or private network 224. The device 100 may be configured to access the public switched telephone network 222 through a wireless network 200, which may comprise one or more nodes 202 configured for communication in accordance a suitable mobile telephony standard. In turn, the wireless network 200 provides the mobile device 100 with connectivity to the Internet or other public wide area network 224, and thence to the organization's host system. Alternatively or additionally, if the mobile device is provisioned to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like, the mobile device 100 accesses the public or private wide area network 224 through a third-party access point, such as the user's own personal access point and Internet connection, or a third party hotspot device, as denoted by the access point 205.

The services above, such as directory services and messaging, can be provided in a self-hosted system as suggested above, i.e., a host system supplied by and managed by the organization itself. However, the person skilled in the art will appreciate that one or more services provided to organization users may instead by provided by third parties in a software as a service, platform as a service, or infrastructure as a service arrangement, colloquially referred to as cloud computing services. For example, email messaging services or collaborative applications can be hosted by a third party service maintaining an external server 260 and data repository 265. Access to the external server 260 can be made available both externally to external client devices such as the mobile device 100, and to client devices 251 within the organization's LAN over the public or private network 224. Regardless, the organization's network services are made available only to those users who possess sufficient credentials to access the services, whether they are accessed internally or externally, and whether provided by the organization's self-hosted or virtually (externally) hosted system. Credentials may be administered by one or more administrative or security servers (not illustrated), and access privileges defined by an administrator. The users 10 to 50 of FIG. 1 who are granted access to the organization's services may thus be considered to be within the organization's domain, which in turn can be considered to be a logical grouping of network resources and client devices. The domain can be specifically defined as a grouping of such computing devices having access to a centralized security or directory service, which is used to store and maintain user identifiers (e.g. account names or email addresses, and in the case of a centralized security service, security credentials) for those users granted access to organizational network resources.

The person skilled in the art will appreciate that the network arrangements and host system described with reference to FIG. 2 comprise only one example, and that the embodiments described herein may be adapted to operate using any appropriate configuration of the organization's host system, any public or private network providing external access to the organization's host system, and regardless whether a user of the domain accesses the host system from within the organization's LAN or externally.

Each of the users 10 through 50 is provisioned with accounts in the organization's domain, whether self-hosted or externally hosted by a third party. Messaging services in particular are accessible by the users through messaging clients executing on the users' client devices 100, 251, which communicate with a message server such as the server 250 or 260. The message server, or a directory server in communication with the message server (such as another server 250 or 260, not shown) provides access to a global directory listing or contact database for the organization. The organizational directory listing may not be truly global for each user; for example, users may have differing levels of access to network resources depending on their credentials or permissions granted by an administrator. This directory listing stores contact data (e.g. first and last name, friendly or common name, mailing address, email address, IM address, telephone number and/or SMS number, and so forth) for each user within the organization. Optionally, the directory listing stores contact data for individuals and other entities outside the organization.

Further, individual users within the domain may have a personal contacts database or address book, which can be a subset of the contact data in the global directory listing, or contain contact data for other individuals or entities not represented in the global directory listing. Population of the personal address book is typically carried out by the user either manually (through express entry of contact data in the personal address book) or automatically (through the user's selection of contact data from the global directory listing to be included in the personal address book). The contact data stored in the user's personal address book may thus be considered to be indicative of prior contact or a social relationship between the user and the users represented by the stored contact data. The contents of the individual personal address books may be periodically synchronized with the contact data stored in the global directory listing. The address book data can be accessed through an independently executing address book application on the client device, or alternatively through the user's messaging client application.

The operation of the personal address book application and the messaging client application (as well as the storage and management of the global directory listing) will be known to those skilled in the art. A further, optional, aspect of the messaging client application that will be generally understood by those skilled in the art is an "autofill" or "autocomplete" feature that may be implemented in a messaging composition screen. When the user composes a message using the messaging client, the composition screen typically includes a field for entry of at least one addressee. When at least one character is entered in the address entry field, a list (e.g. a drop-down list) of addresses or names from the personal address book comprising a string matching the at least one entered character is displayed. Optionally, entry of additional characters in the address entry field filters the displayed list further to display only those matching address book entries. Rather than completing entry of the address by typing, the user can then select an entry in the displayed list to thus automatically fill or complete the address entry field. While the entries in the displayed list may be taken from the user's personal address book, in some embodiments the displayed list is also taken from a contact data store comprising addresses and optionally names of addressees of messages that were sent from or received at the device, even if those addressees are not represented in entries in the personal address book or global directory list. A messaging client of this type is described in further detail in commonly-owned U.S. Patent Application Publication No. 2011/0087747, filed 6 Apr. 2010, the entirety of which is incorporated herein by reference. The presence of a particular individual's contact information in the autofill contact data store may thus also be representative of the user's prior contact or a social relationship with that individual. It is possible, for example, that the user would be less likely to address a new message to a recipient whose contact information is not currently stored in either the personal address book or in the autofill contact data store, despite the availability of the recipient's contact information in global directory list accessible by the user from within the organization's domain.

Returning to the example of the first user 10 wishing to locate an appropriate SME within the organization's domain, if the first user 10 does not have any personal knowledge of the target SME (or, as discussed above, if the target SME's contact information is not stored in user 10's personal address book or autofill contact data store), in order to identify the target SME (in this case, user 50), the user 10 may have to consult other resources. These resources may include a directory of SMEs within the organization's domain identifying particular users as having subject matter expertise, or a search engine for searching the global directory listing for entries having keywords indicative of subject matter expertise, if the global directory listing entries include such data. Both of these solutions, however, require prior and explicit identification of the SMEs within the organization, and the compilation of the SME directory or the addition of keywords to the global directory listing. Known techniques for identifying SMEs for this purpose typically involve interviews and/or surveys of the individual members of the organization to determine their particular expertise, or to have them identify other individuals within the organization that they believe possess subject matter expertise. The results of these interviews and surveys must then be tabulated, and keywords or SME descriptors determined from those results. Further, as individuals join and leave the organization, the makeup of SMEs within the organization can change. Resources of this nature are therefore subject to the risk of being significantly out of date and not reflective of the current set of users currently registered with the organization's domain, or currently listed within the global directory list.

Further, if the user 10 is in the midst of composing a message to be sent to the target SME who is currently unknown to the user 10, he or she must interrupt message composition, launch a separate program on the client device to search through the organization's directory listing or otherwise access an SME directory, identify the target SME, copy the target SME's messaging address, return to the messaging application, then paste the target SME's address in the address field of the message being composed. Locating and addressing a message to the target SME thus incurs delay and increases consumption of processing resources at the user 10's client device, as well as at the host system providing access to directory listings.

Figure 3:
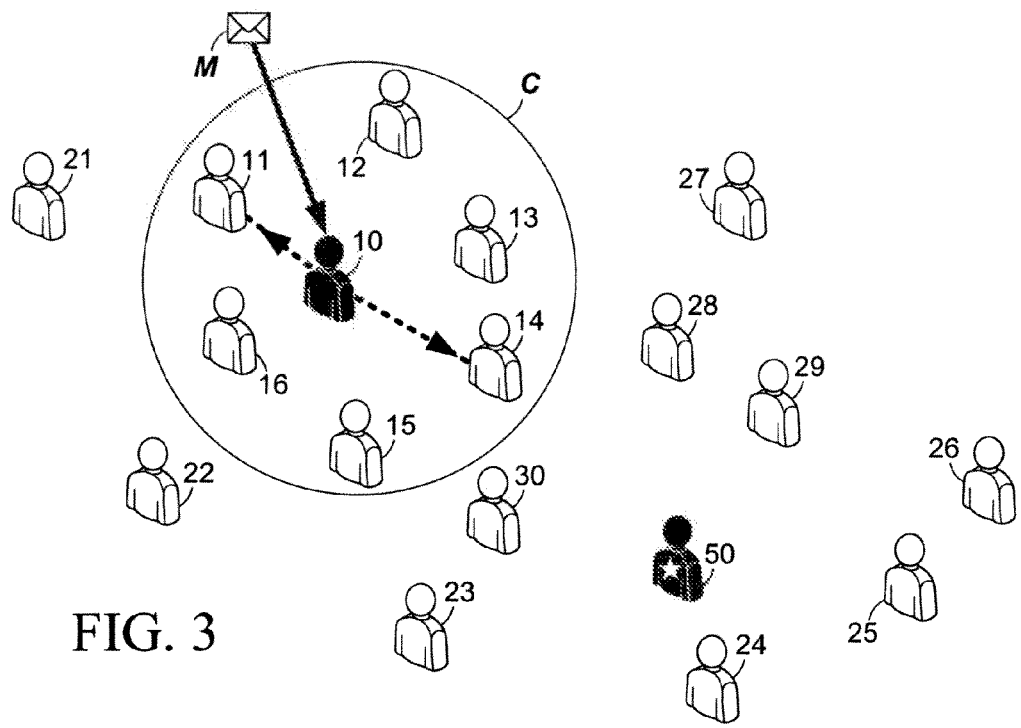
FIG. 3 is another schematic diagram of the set of users of FIG. 1 illustrating a possible path of messages transmitted within the domain.
Figure 4:
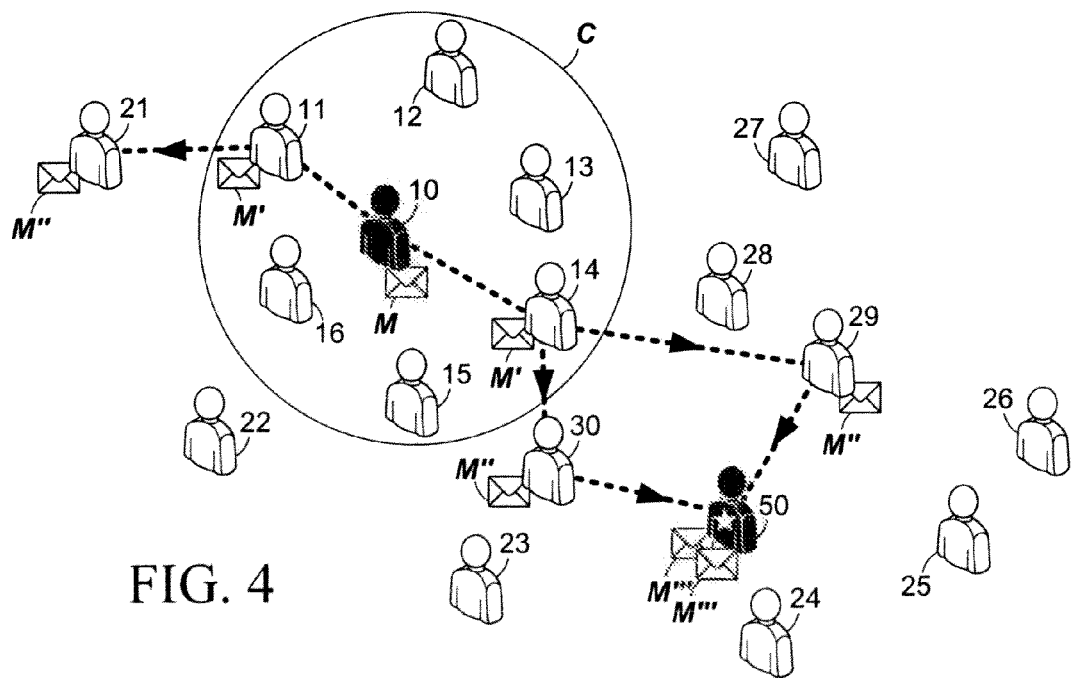
FIG. 4 is a further schematic diagram of the set of users of FIG. 3 illustrating a further possible path of messages transmitted within the domain.

These difficulties may thus result in the chain of events illustrated in FIGS. 3 and 4. Suppose the user 10 receives a message M, as shown in FIG. 3, relating to a topic that he or she believes may be of interest to a person with expertise in the relevant field. However, the user 10 is not aware of, or is unable to identify, the appropriate SME user 50 within the organization. The user 10 therefore resorts to contacting those people within his or her circle of acquaintances C (e.g., the contacts stored within the user's personal address book or autofill contact data store) in the hopes that one of those individuals will be able to identify the appropriate SME user 50 within the organization.

Thus, as illustrated in FIG. 4, the user 10 forwards the message M to one or more users 11, 14 with whom he is acquainted (i.e., within the boundary C). The forwarded message, M', may simply contain content from the original message M, or it may also contain content added by the user 10 (e.g., prefatory remarks, an inquiry relating to the subject of the message M, etc.). The recipients of M', users 11 and 14, may themselves not be aware of the appropriate SME, in which case one or more of them may then forward the message to their own acquaintances within the organization to assist the original user 10 in locating the appropriate SME. In FIG. 4, this is illustrated by arrows showing that the first recipient 11 forwards a message M", derived from the received message M', to user 21, who is within the first recipient 11's circle of acquaintances. The second recipient 14 forwards a message M" (it is assumed in this simple example that the message sent by users 11 and 14 is coincidentally the same) to two other users that she knows of, users 29 and 30.

In this example, the first second-stage recipient 21 does not forward the message on to another party, either because user 21 does not know who the target SME might be, or because the user 21 believes that he or she is the intended recipient. Both users 29 and 30, however, forward the message on to the person they believe is the desired SME, user 50, as a further forwarded message M'''. User 50 thus receives two copies of a message that ultimately contains the same content.

Ultimately, then, the message M (or rather, a forwarded or derivative copy thereof) is received by the intended target SME user 50, but the process followed in FIGS. 3 and 4 incurred delay and additional processing and storage overhead within the host system and at the individual client devices of users 11, 14, 21, 29, 30 and 50. Because the user 10 was socially three degrees removed from the SME user 50 (the message M underwent three "hops" to reach user 50, even though users 10 and 50 were located in the same domain), user 10's personal acquaintances or immediate contact resources (i.e. personal address book or autofill contact data store) were relied on to initiate forwarding of the message to user 50. As a result of this message chain, eight copies or derivative versions of the originally received message M are now resident within the organization's data stores (each user involved receiving one copy of a message, with the exception of SME user 50, who received two). The messaging server for the organization was required to handle the transfer of messages between each of users 10 and 14, 10 and 11, 11 and 21, 14 and 29, 14 and 30, 29 and 50, and 30 and 50 in order to achieve delivery of information from user 10 to user 50, and the various individual users were also required to operate their respective messaging client to forward the message as appropriate. Further, had neither of users 29 or 30 forwarded the message to the SME user 50, the latter user might not have received the message; and even once the message was received by the SME user 50, the first user 10 is no "closer" socially to the SME user 50, nor is the SME user 50's contact information available in the first user 10's personal address book or autofill contact data store, as the user 10 did not actually send the message to the user 50 him- or herself.

Figure 5:
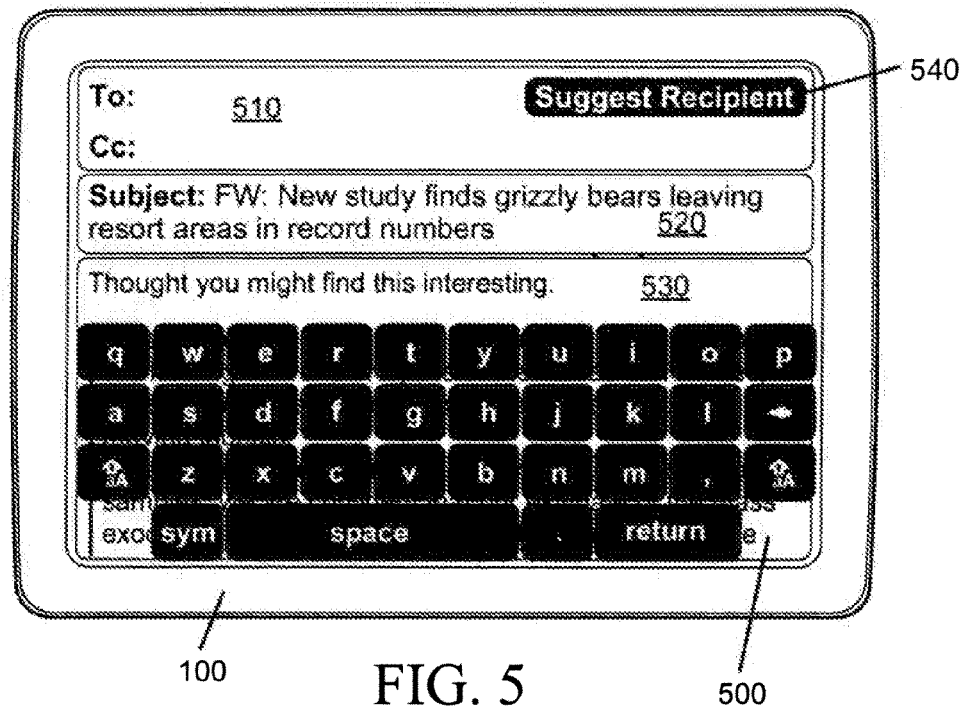
FIG. 5 is an illustration of a message composition screen displayable at a client device.

Accordingly, the messaging client executing on the client device 251 or 100 may be adapted to permit the user to select an appropriate addressee from a set of suggested addresses, as illustrated in FIGS. 5 through 10. FIG. 5 illustrates a non-limiting example of a message composition screen 500 (in this example, an email composition screen) displayable at a client device, in this example a mobile touchscreen device. In the message composition screen, as is known to those skilled in the art, user interface elements such as data entry fields 510, 520 and 530 may be displayed. An address entry field 510 may be populated with addressee information (e.g., an email address), either entered directly by the user or selected from a set of personal address book entries or autofill contact data store entries. In this example, the address entry field 510 can be populated with one or more To: addresses (i.e., a direct addressee) and zero or more Cc: addresses. In those cases where the message is a reply to a previously received message, the address entry field 510 (in particular the direct addressee) may be automatically populated with the address of the sender and optionally recipients of the previously received message.

The subject line field 520 is provided for entry of a subject line for the message to be sent. In those cases where the message is a reply to a previously received message or a forward of a previously received message, the subject line field 520 may be automatically populated with a subject line derived from the previously received message's subject line. It is commonly known in the art, for example, to populate a reply or forward message subject line field with the subject line of the previously received message preceded by a token indicating the message's status as a reply or forward message (in English, the token may comprise "Re:" or "Fw:", respectively). In the example of FIG. 5, the message being composed is a forward of a previously received message.

Finally, the message body field 530 is provided for entry of message body content. Where the message is a reply or forward of a previously received message, the message body field 530 may be populated with content from the previously received message. Each of the fields 510, 520 and 530 is typically editable by the user composing the message, even if those fields are first populated with data from a previous message.

Not all of these fields need be provided in the message composition screen 500. For example, if the message being composed is a part of a message thread or conversation with another user or group of users, the address entry field may not be shown since the addressee or addressees of the message have already been identified. The addressees designated for the message, however, may still be editable by the user. Some message formats, such as instant messages, typically exclude subject lines, in which case the message composition screen need not display the subject line entry field 520.

In accordance with a first embodiment, the message composition screen 500 is further provided with a further user interface element 540 which may be actuated by the user to obtain suggestions for addressees (or further addressees) of the message being composed. In this embodiment, the user interface element 540 is displayed as a virtual button. Actuation of this user interface element 540 invokes a process transmitting a request to the message server or another server of the organization's host system for suggested recipients of the message based on the subject line and/or message body content in the fields 520, 530. In response to the request, the server determines which users correspond to the content of the subject line and/or message body. To do so, the server may query a dedicated data store associating subject matter keywords with organization users, or a global directory listing or other organizational directory listing associating subject matter keywords with organization users. This process is described in further detail below. The server then transmits a response comprising contact data for one or more suggested addressees, and the messaging client may then display an addressee selection interface so that the user may select one or more of the suggested addressees.

Figure 6:
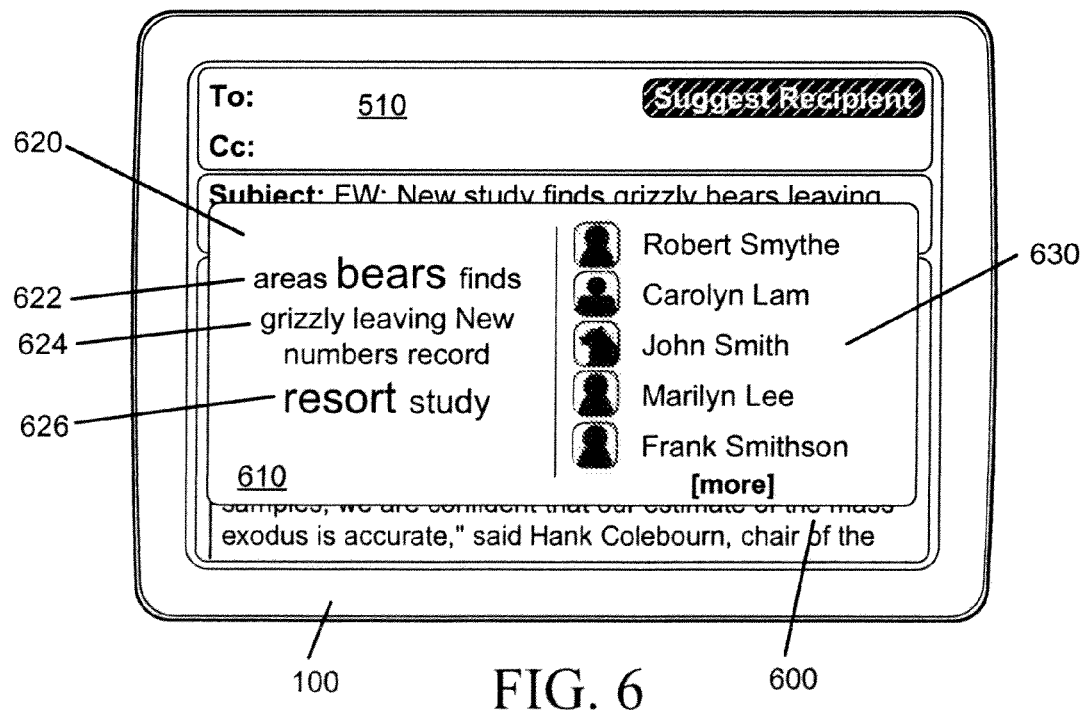
FIG. 6 is an illustration of a contact selection screen displayable at a client device.

An example of an addressee selection screen 600 is shown in FIG. 6. A user interface element is displayed, here a dialog box 610, overlaying the original message composition screen and comprising suggested addresses for the message being composed. In this example, the suggestions are based on the subject line, and the dialog box 610 displays keywords from the subject line in area 620 and a list of associated suggested addressees from in area 630. In this particular example, the keywords from the subject line are visually formatted to indicate the prevalence of possible SMEs associated with those keywords within the organization directory (for example, those keywords that occur with the greatest frequency in the dedicated data store or organization directory mentioned above). Those keywords displayed in a larger font size, such as keyword 626, have more possible SMEs associated with them than those keywords displayed in a smaller font size, such as keywords 622 and 624. The suggested addressees may be those addressees from the organization directory associated with any one of the keywords, or only those associated with the largest font size keywords. Further, the suggested addressees may be arranged in the dialog box 610 in order of relevance (i.e., those addresses that are the best matches for the displayed keywords), alphabetical order, or in any other appropriate order.

Figure 7:
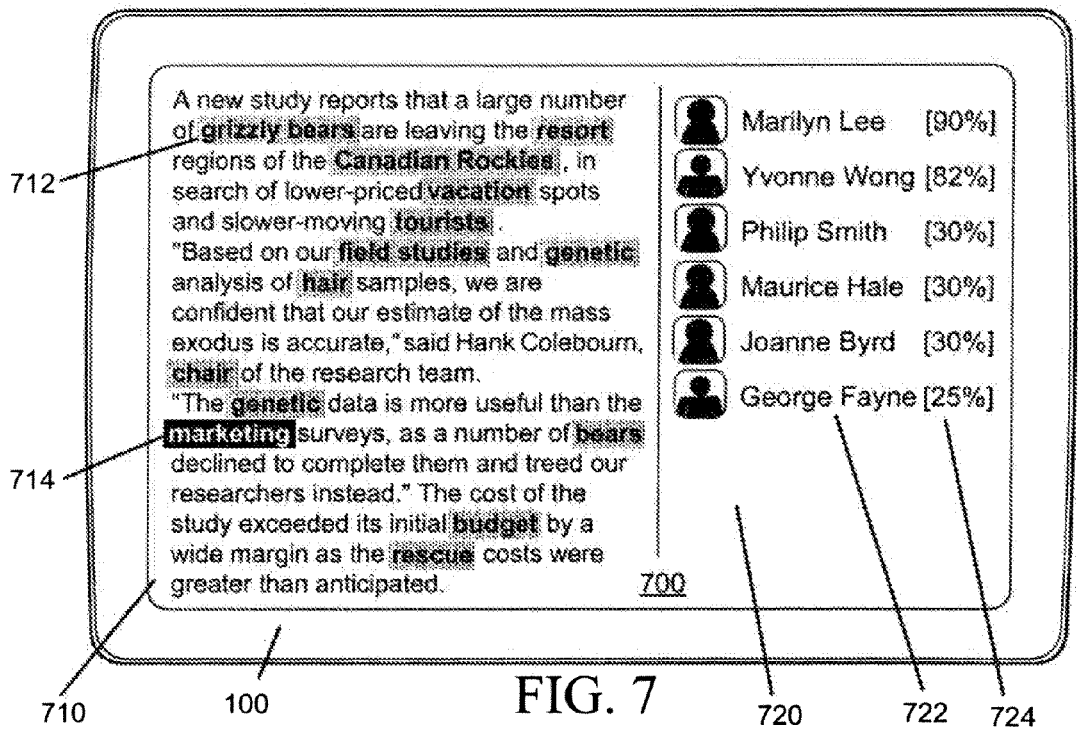
FIG. 7 is an illustration of a further contact selection screen displayable at a client device.

In some embodiments, the suggested addressees returned by the server may be based on the content of the message body field 530. FIG. 7 illustrates an example of an addressee selection screen 700 displayed after the messaging client receives the suggested addressees from the server. In this example, the selection screen 700 includes a message display area 710, which displays content from the message body field 530, and a suggested addressee display area 720. The message display area displays all or part of the message body field content, and further highlights those words that were selected or identified as keywords by the server, such as keywords 712 and 714. The suggested addressee display area 720 displays those suggested addressees that correspond to a selected one of the keywords. In the example of FIG. 7, keyword 714 is selected, as indicated by its distinct highlight background, and the list of addressees 722 comprises those addressees determined by the server to be associated with that keyword 714. Further, the suggested addressee display area 720 indicates the relative relevance of each addressee, e.g. a degree of confidence in the correlation between each suggested addressee and the selected keyword. Here, the relevance is expressed as a percentage 724.

Figure 8:
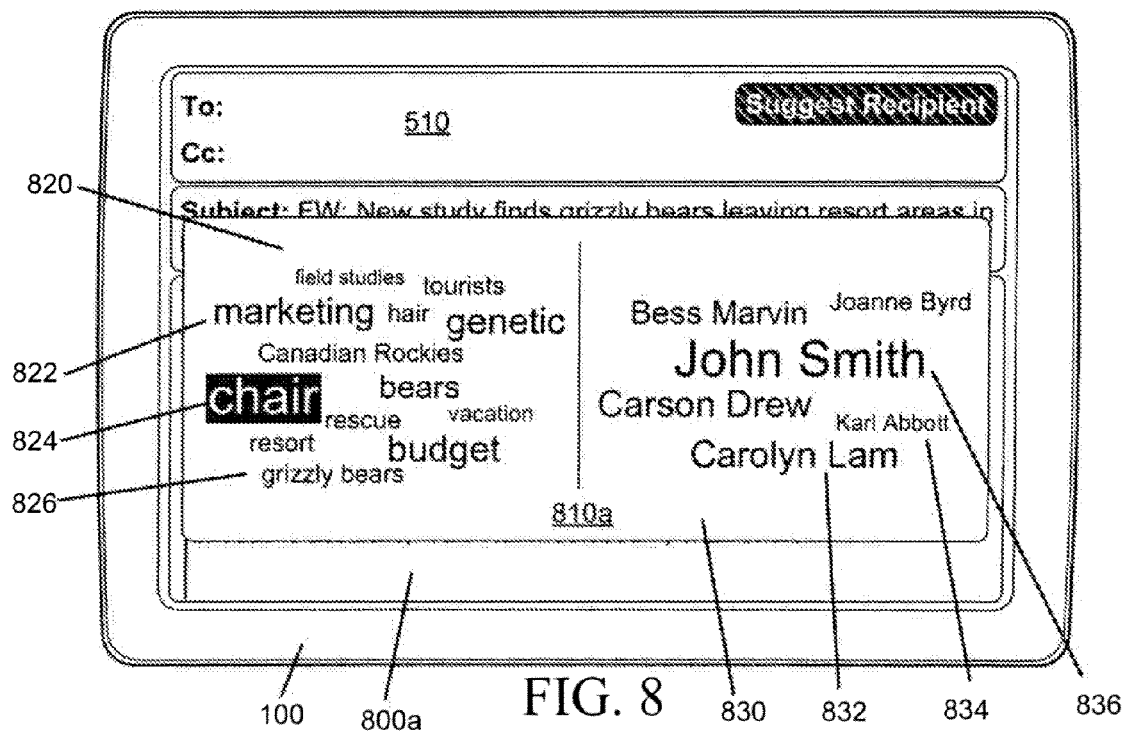
FIG. 8 is an illustration of still a further contact selection screen displayable at a client device.

Yet another example of the addressee selection screen 800a is illustrated in FIG. 8. In this example, an addressee selection dialog box 810a is overlaid on the original message composition screen. A first area 810 of the dialog box 810a displays in a first area 820 keywords used to identify potential addressees (in this example, selected from the message body from the message body field 530), and in a second area 830 suggested addressees associated with those keywords. As in the example of FIG. 6, the keywords are visually formatted to reflect their prevalence in the dedicated data store or organization directory, with those keywords in larger font sizes, such as keyword 824, occurring more frequently than those keywords displayed in smaller font sizes, such as keywords 822 and 826. In this example keyword 822 is displayed in a slightly larger font size than keyword 826, and thus occurs more frequently.

The second area 830 displays those suggested addressees received from the server that are associated with a selected keyword displayed in the first area 820. In FIG. 8, the most frequently occurring keyword "chair" 824 is selected, as indicated by the highlighting, and the corresponding suggested addressees corresponding to that keyword 824 are displayed. The suggested addressees are also visually formatted according to their relative relevance to the selected keyword 724, wherein those addressees displayed in a larger font size, such as addressee 836, are those determined to be more relevant than those displayed in a smaller font size, such as addressees 832 and 834. In all the foregoing examples, the suggested addressees are displayed by common name or friendly name, e.g., first name and last name. In other embodiments, the suggested addressees may be displayed by email or other messaging address, particularly if no common or friendly name is available.

Figure 9:
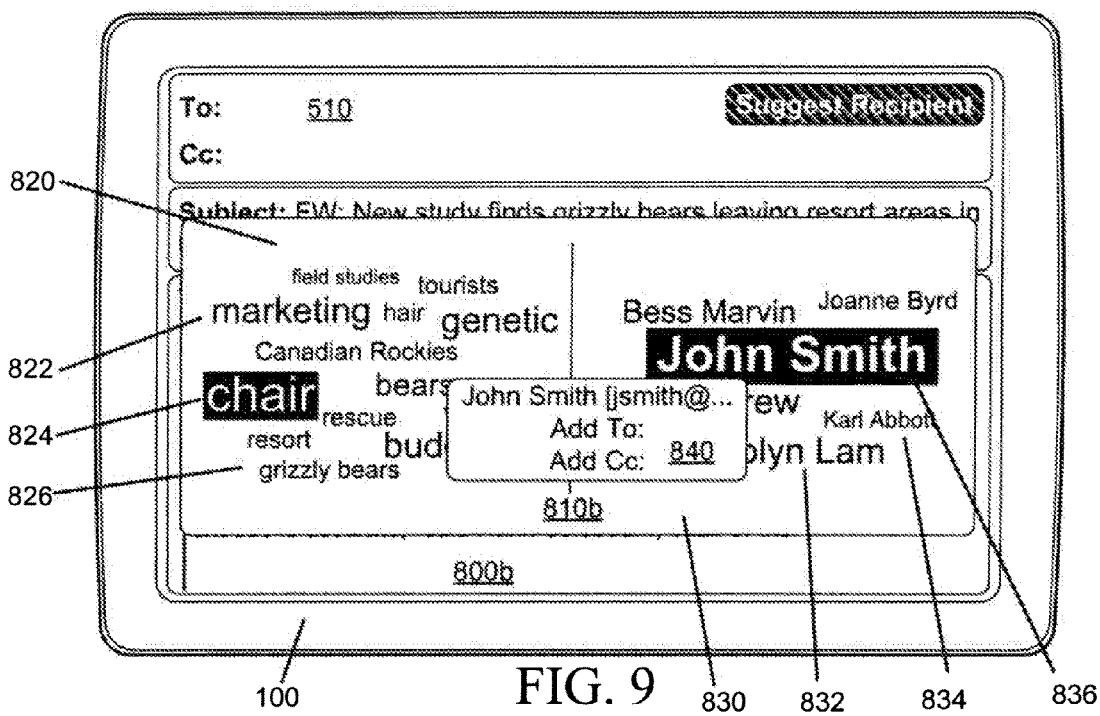
FIG. 9 is an illustration of contact selection implemented using the contact selection screen of FIG. 8.

One or more of the suggested addressees in the second area 830 may be selected for insertion into the address entry field 510. Turning to FIG. 9, a second screen 800b is shown in which one of the suggested addressees 836 in the dialog box, now indicated as 810b, has been selected. Upon selection, in this embodiment a further dialog box 840 is displayed to permit the user to select whether the addressee is to be added to the To: or the Cc: field of the address entry field 510. This intervening step in addressing the message may be excluded; for example, selection of the addressee 836 may result in automatic insertion of the addressee in the address entry field 510 in the To: field. In a further embodiment, the user interface element 540 of FIG. 5 may be displayed for each portion of the address entry field 510: one for the To: field and one for the Cc: field, in addition to a further element 540 for a Bcc: or other type of addressee field (not shown in FIG. 5). Thus, if the user wished to receive suggestions for addressees for the Cc: field, the user would actuate the user interface element 540 displayed specifically for the Cc: field.

Figure 10:
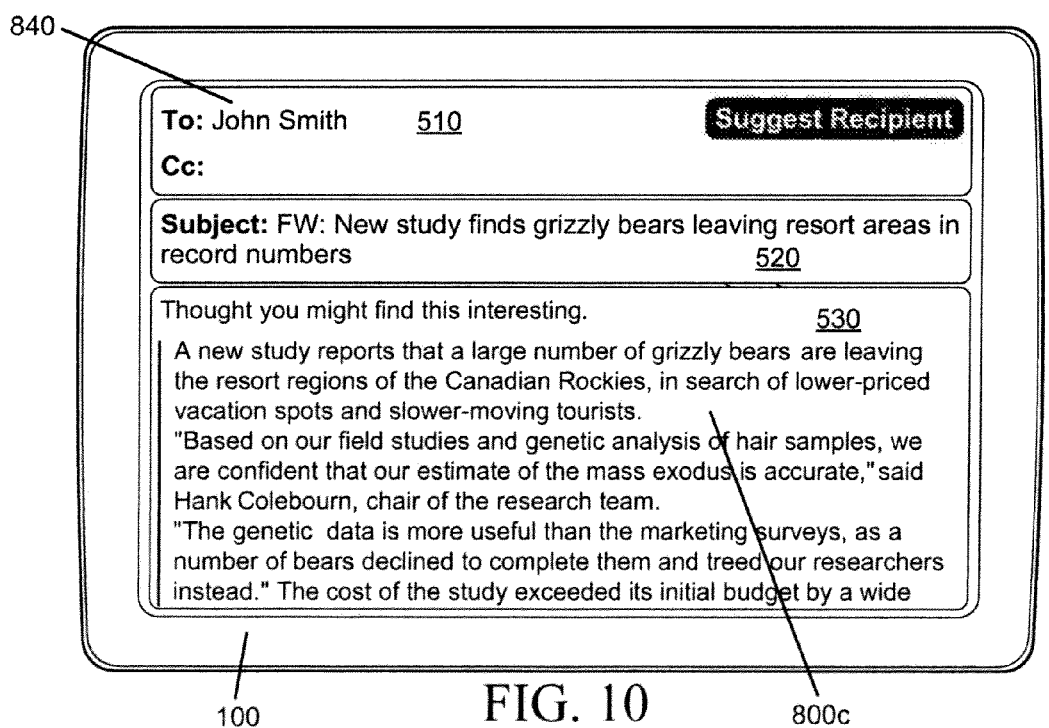
FIG. 10 is an illustration of the message composition screen of FIG. 5 after selection of a contact address.

In FIG. 10, a further message composition screen 800c is displayed, in which the overlaid dialog boxes 810b, 840 have been removed and the original message entry fields 510, 520 and 530 are displayed. Now, since the user had selected the selected addressee 836 of FIG. 9 to be inserted in the To: field of address entry field 510, the address entry field 510 now displays this addressee. Further suggestions for addressees could be requested by the messaging client if desired by the user.

Figure 11:
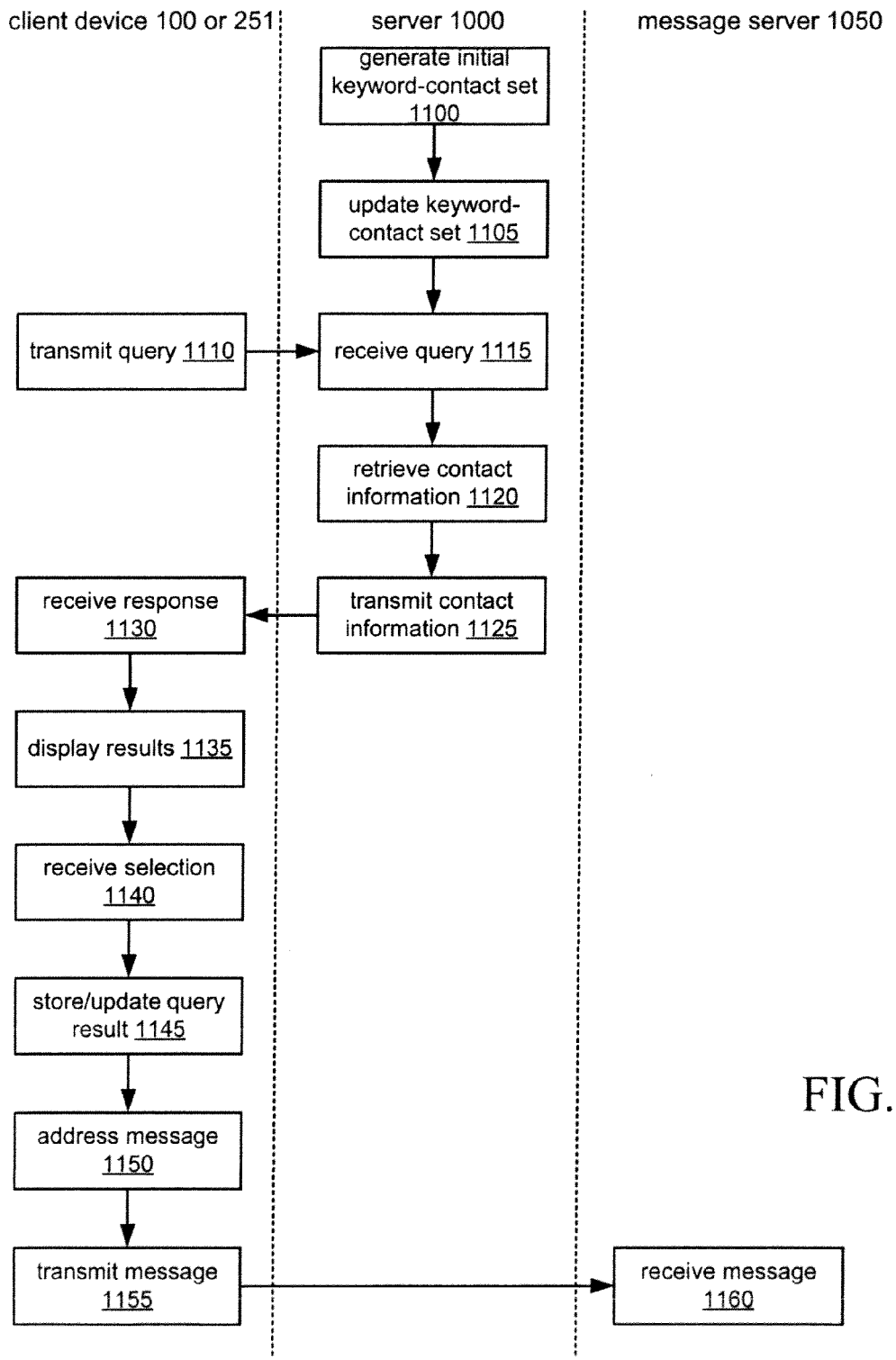
FIG. 11 is a flowchart illustrating a process for providing suggested contacts to a client device for addressing a message.

An overview of the process by which suggested addresses are provided to the messaging client is illustrated in FIG. 11. Initially, at a server 1000, a set of data correlating subject matter keywords and user contact data is created or generated at 1100. The server 1000 at which the data is created or generated need not be the same as the organization's message server 1050, which is illustrated as a separate node in FIG. 11. In other embodiments, however, the server 1000 and message server 1050 may be the same. The keyword data set may comprise any appropriate data structure, ranging from, for example, a flat file to a relational database, provided that a relationship between each keyword therein and the set of users with which the keyword is associated is represented. The generation or creation of the keyword data set may take place using any appropriate method. In some embodiments, the set of keywords and associated users may be developed using interviews or surveys as described above, but in a further embodiment they are developed based on message threads, further explained below.

At 1105, after initial generation or creation of the keyword data set, the data set is updated as necessary based on the continued identification of further SMEs within the organization. This step may take place at any time during the process illustrated in FIG. 11.

A query is transmitted from the client device 100 or 251 at 1110. This query comprises, at a minimum, at least a portion of the subject line or the message body of the message being composed. If the query is based only on subject line, then the query is not transmitted from the client device 100 or 251 until characters have been entered in the subject line field for the message being composed. The server 1000 receives the query at 1115, and retrieves the appropriate contact data corresponding to the keywords comprised in the query at 1120. At 1125, the response is transmitted to the client device 100 or 251, then received at the client device 100 or 251 at 1130. At 1135, the results are displayed at the client device 100 or 251, and a selection of at least one addressee received at 1140. At 1145, the contact data received from the server 1000 selected at 1140 is then used to updated the personal address book at the client device 100, 251 or the autofill contact data store at 1145. At 1150 the message being composed at the client device 100, 251 is addressed using the selected addressee(s). This step may occur before the personal address book or autofill contact data store is updated at 1145. Since the address of the selected addressee can be added to the user's personal address book or autofill contact data store at this stage, the addressee is brought into the set of users defined by the boundary C of FIG. 1. Finally, the message is transmitted from the client device at 1155, where it is received by the message server 1050 for further transmission to the indicated addressees.

Figure 12:
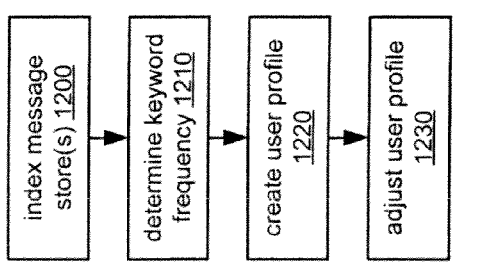
FIG. 12 is a flowchart illustrating a process for generating a subject matter profile for a message sender.

The process by which SMEs are identified at the outset of the process of FIG. 11, and by which the keyword data set is originally developed, is further described with reference to FIGS. 12 through 16. Rather than embarking on an onerous interview or survey process, in one embodiment existing data stores within the organization are mined to identify potential SMEs. In FIG. 12, message stores—for example, user inboxes resident either at the client devices 100, 251 or at a data repository at the host system—are mined to associate frequently occurring keywords with individual users. At 1200, the message stores for the users within the organization domain are indexed according to keyword. The keywords may comprise any words within the subject lines of the messages within the message stores, or may comprise words from the message bodies as well. The words from the messages selected as keywords may exclude "stopped" words that are commonly excluded from indexing. At 1210, the frequency of occurrence of different keywords is determined for each user within the domain, then a user profile 1220 is created based on those frequencies. For example, the frequency of occurrence of each keyword is compared with the corresponding frequency of occurrence of that same keyword for other users within the domain, and each user ranked according to increasing frequency; those users for whom the given keyword occurs most frequently are scored highest. Other algorithms for associating keywords found in messages with users so as to identify those users with the highest incidence of those keywords may be employed, and implementation of such algorithms will be known to those skilled in the art. The keywords are effectively used as a heuristic to identify the potential subject matter experts for a given subject area, where that subject area is identified by the keyword. However the heuristic is applied, a user profile can then be developed which associates the user with a set of one or more keywords with which he or she is associated. For each associated keyword, the user may be assigned a score value reflecting a degree of frequency of incidence of that keyword for that user.

Once this initial user profile is established at 1220, it may be updated periodically as indicated by block 1230 as the user's message store changes with time. These initial user profiles may be stored in a single data store at the host system, for example at the message server. In some embodiments, the individual user profiles are added to a database or other data structure associating each of the set of keywords identified across the entire organization with the set of users within the organization domain, so that queries may be executed to look up a set of users, and optionally their corresponding scores, for a given keyword.

It will be appreciated by those skilled in the art that establishing and updating a user profile in the above manner, which requires mining every user's message store for keywords, computing frequencies of occurrence, and then comparing the results for each keyword against the frequencies of occurrence for every other user in the domain, is a brute force method that requires a significant amount of processing overhead from the host system. Accordingly, in some embodiments, the determination whether a given user is to be associated with keywords drawn from a received message is based on heuristics such as the user's participation in a message thread containing the message, whether the user was identified as an appropriate recipient of the message by other users within the organization domain, and the user's own handling of the received message. These actions are used to evaluate a score for the message or the message thread, which is associated with both the keywords found within the message subject line or body, and with at least one user receiving the message or participating in the message thread.

Figure 13:
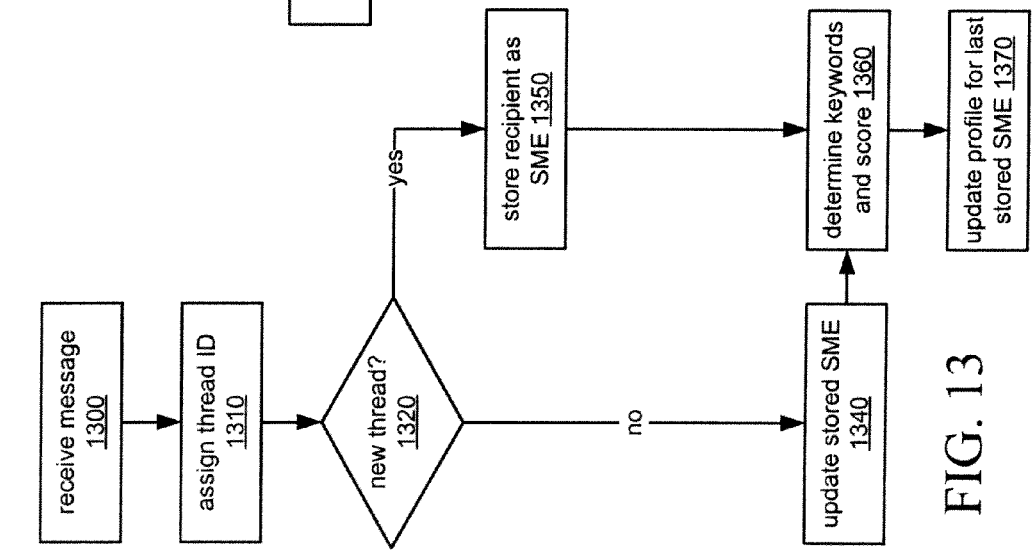
FIG. 13 is a flowchart illustrating a process for updating subject matter profiles based on latest message thread recipient.

One example of such a process is illustrated in FIG. 13, where one or more users are identified as a potential SME for each message thread propagated within the organization domain, and the score for the keywords identified in the message thread (e.g., the message thread's subject line) are attributed to those specific users. In FIG. 13, when a message is first received within the organization domain—either from a source external to the domain, from within the domain itself (e.g., a message that is originally composed at a client device 100, 251)—it is assigned a thread identifier at 1310 by the server 1000 or 1050. The computation and association of thread identifiers to messages, in particular email messages, is known to those skilled in the art. For example, the thread identifier may be computed based on the subject line of the message, stripping out any preceding tokens used to identify the message as a reply or forward message. Membership in a thread may also be determined based on identifier values embedded within the message header itself that identify the message as belonging to a specific thread or conversation.

If the thread is a new thread, as determined at 1320, then at 1350 an identifier of the recipient of the message is stored by the server in association with the thread identifier as the current SME associated with that message thread. If, however, the thread is not a new thread, then at 1340 the user that was previously associated with the message thread as the SME is updated to reflect the identity of the new recipient. In other words, each time the message thread is propagated to a further recipient, that most recent recipient is identified as the SME associated with that message thread. The association of the most recent recipient with the message thread as the SME may be stored at the message server or another data store within the host system.

At some designated time—for example, at the end of the day, or once a week or month, each message thread determined to be associated with an SME is scanned to identify keywords within their subject line or message body contents at 1360. The user profile for the user associated with the thread as SME is then updated at 1370 to reflect an association between the user and those keywords, for example by attributing the score received for each keyword to the user's existing profile. The keyword database associating users with keywords is then updated.

Thus, returning to the example message flow of FIG. 4, when the message M is initially received by the user 10, the server 1000 or 1050 stores the user 10 in association with M's thread identifier as the current SME. When the user 10 forwards the message to the next two users 11, 14, the server 1000 or 1050 updates the stored associated SME to reflect, in this case, both users 11 and 14 since the message M' would have been transmitted to each at the same time. The SME associated with the message thread is updated as the message is forwarded along the chain of users indicated in FIG. 4. Since it is likely that the user 50 would be the last user to be added to the message thread when the message M'" is received, user 50 will be the last user identified as the SME associated with the thread identifier. Then, at step 1360, the keywords are extracted from the message thread (if the message thread is based on the originally received M illustrated in FIG. 5, then an example of a keyword that might be identified from the subject line is "bears"), and a score associated with the keyword. The score may simply be a count of the frequency of occurrence of the word in the subject line, in this case a value of 1. Next, at 1370 it will be user 50's profile updated to reflect this user's association with the keywords identified in the message. If the keyword "bears" was not previously associated with the user 50, then the user's profile is updated to add the keyword value "bear" and the corresponding score value 1. If, however, the keyword "bears" was already associated with the user 50 in his or her profile, then the corresponding score in the profile is incremented to add the score determined in step 1360.

Figure 14:
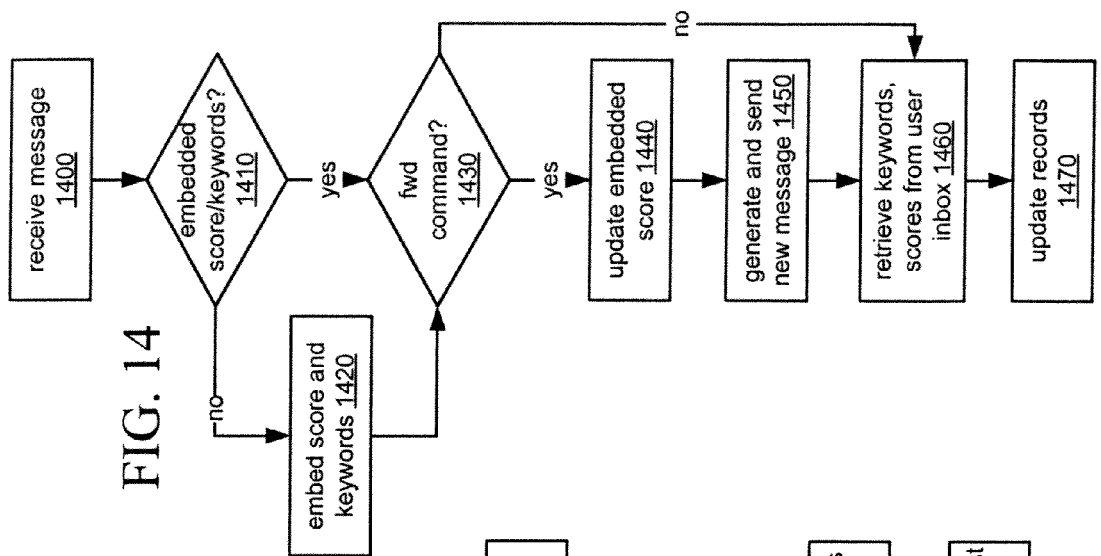
FIG. 14 is a flowchart illustrating a process for updating subject matter profiles based on a user inbox state.

In another embodiment, keywords and accompanying score values are embedded within a received message and updated as the message is transmitted within the organization domain, and the score is updated when the message is forwarded by the recipient user to another. Turning to FIG. 14, after a message is received at 1400 at the message server, its header is scanned for an embedded score or keyword identifier. If there is no score or keyword identifier embedded as determined at 1410, then the message is a new message (for example, received from a source external to the organization domain), and an initial score value (for example, a zero value) and keywords are inserted into the message header at 1420. The keywords embedded are keywords selected from either the subject line of the received message, the message body, or both. The message is then provided by the message server to the messaging client for the organization user to whom the message was addressed.

Subsequently, if the messaging client detects at 1430 that the recipient user has invoked a forward command to create a new message forwarding the received message, at 1440 the score embedded in the message header is incremented by the messaging client. For example, if the current embedded score is zero (because the message was the original new message received at 1400), it is incremented to a value of 1, then the forwarding message is generated, edited by the user as desired, then transmitted to the recipient at 1450. This score thus tracks the number of times a forwarding message is created based on the originally received message. Subsequently, on a periodic basis (such as on a daily, weekly or monthly basis), each user's message store within the organization domain is scanned by the server 1000 or 1050 for recent message headers (i.e., those that had been received since the last scan) to retrieve any embedded keywords and scores at 1460. Each keyword identified from the message is associated with the same score value maintained in the message header, and those keywords and accompanying scores are then used to update each user's profile as described above. Finally, the keyword database is updated with the newly updated user profiles at 1470.

Thus, returning to the example of FIG. 4, each user having a copy of the message in their message store would have their profile updated to reflect both the keywords found in the message and their associated scores. In this case, however, the scores will be different for each user depending on their position in the chain of messages originating from M. For the original recipient user 10, having received the message M, the keywords (for example, "bears") would be initially embedded along with an initial score of zero. When user 10 forwards the message to users 11 and 14, the message M' is created, but the score embedded in the message is incremented to a value of 1 at step 1440. Both users 11 and 14 subsequently forward the message to other recipients; thus, user 21 and users 29 and 30 each receive M", in which the embedded score was incremented to a value of 2. Finally, when each of users 29 and 30 forward the message to user 50, their respective messaging clients increment the embedded score in the message to a value of 3. User 50 therefore receives two messages M'", each of them bearing a score of 3.

When the keywords and scores are retrieved from each user's message store at step 1460 and used to update the user's profile in respect of those keywords, user 10's profile is not incremented, since the message M was assigned a score of zero; users 11 and 14 have their profiles updated to include the keyword "bears" if it is not already included, with an associated score of 1 (or else their existing score for the keyword "bears" is incremented by 1); users 21, 29 and 30 each have their profiles updated to reflect the keyword "bears" and a corresponding score of 2, either by adding the keyword and the corresponding score, or else incrementing the existing score for the keyword by 2; and user 50's profile is updated to reflect a total score of 6, since two messages were received by user 50 with that score. By embedding a score in the message that is updated by the messaging clients to track the number of times the message is forwarded, generally the final recipient of the chain of forwarded messages and/or the recipient of the greatest number of copies of the original message will receive the highest score.

In another embodiment, rather than tracking the message thread or altering the message header to increment a score, the server 1000 or 1050 evaluates actions applied to a message by each recipient user, and adjusts an accompanying score accordingly. In this embodiment, it is presumed that user actions such as reply, forward, delete, and file that are executed at the messaging client are synchronized or mirrored at the message server 1050, so that the server 1000 or 1050 can track those actions.

Turning to FIG. 15, at 1500 a message is received. Next, keywords are determined for the message at the server 1000 or 1050, and stored in association with the user. Each of these keywords may be initially assigned an initial score, such as zero. Optionally, if the message received was a forwarded message as determined at 1520 (which may be determined by detecting a "Fw:" or similar token in the message subject line, or by a tag embedded in the message header), it may be presumed that the recipient user was identified by a sender as a desired recipient, and therefore potentially a SME; therefore, the score associated with the identified keywords is incremented at 1530, for example by a value of 1.

Otherwise, at 1540, if a user action is detected at the server 1000 for 1050 resulting from a user operation at the messaging client that is synchronized or mirrored at the message server 1050, the stored scores for the associated keywords of that message are updated at 1550. The scores may be incremented according to a set of rules defined according to heuristics for assessing the relevance of a message to a user's knowledge or expertise, for example:

TABLE 1

| Action | Score | Comment |
| --- | --- | --- |
| read message | +0 | not necessarily indicative of subject matter expertise |
| reply to message | +0/+1 | 0 if message replied to with only brief additional content<br>+1 if message replied to with signficant additional content |
| forward message to new recipient(s) | −1/+1 | −1 if message forwarded with only brief additional content<br>+1 if message forwarded with significant additional content |
| file message | +1 | may be indicative of interest or expertise |
| delete message | +0 | not necessarily indicative of subject matter expertise |

In the above set of rules, if the user action is to read the message, the score is not adjusted, since any user, whether a SME or not, may choose to read a message. If the user replies to the message, in some embodiments the score is not incremented. However, in some embodiments, the size of the reply message may be compared to the size of the received message to determine whether it is likely the user added significant comment in a reply (for example, if there is a difference of at least 2K over the size of the received message), since a SME may be more likely to provide substantive remarks in a reply message. In that case, the score may be incremented by 1.

If the detected user action is to forward the message to another recipient or recipients, then the score is decremented by 1, since the forwarding action is an indicator that the recipient does not believe that he or she is the person who should have received the message. In alternate embodiments, however, the score may be incremented by 1 in the case where the recipient forwards the message with additional significant commentary, since again this may be indicative of subject matter expertise.

If the user files the message, the score may again be incremented by 1, since the user's decision to store the message for later reference may be indicative of interest or subject matter expertise. Finally, if the user deletes the message, there is no score adjustment since deletion is not necessarily indicative of lack of interest or expertise.

Finally, on a periodic basis (again, for example, once a day, week, or month, at some other frequency or on an ad hoc basis), the user profile is updated at 1560 with the keywords and accompanying scores identified for that user. Alternatively, the profile for each user may be updated after the latest increment for that keyword has been determined at 1550. The foregoing process may be applied to every message received on behalf of the user. Turning again to the example of FIG. 4 and the path of the message M from user 10 to user 50, when the message M is received by user 10, keywords are assigned at 1510 (for example, "bears") and given an accompanying score of 0. Since the message is not a forwarded message when originally received by the user 10, the user action is awaited. At 1540, a forward action is detected, which thus either decrements or increments the score by 1. In this example, the message is forwarded without significant comment so the score is decremented by 1, resulting in a score of −1.

The message M' is then received by user 14 at 1500, and again for that user, the keywords are identified, and an initial score of zero associated with the keywords for the user 14. However, since it is determined at 1520 that the message is a forwarded message, the score is incremented at 1530 to a value of 1. Subsequently, the user 14's action of forwarding the message is detected at 1540, with the result that the score is reduced to 0 at 1550.

Next, the message M" is received by each of users 29 and 30. Again for them, the keywords and initial zero score as established at 1510; and again, since the message is determined to be a forwarded message at 1520, the score is incremented by 1 for each of them at 1530. However, because the detected user action at 1540 for both of users 29 and 30 is to forward the message onwards, each of their scores is decreased to zero at 1550.

Finally, the message M'" is received by the SME user 50, twice, from each of users 29 and 30. For each message, the keywords and initial score are established at 1510. Since each message will comprise the same keywords, only a single entry of each keyword need be stored in association with the user 50; however, any increments to the score associated with that keyword will be cumulative. Since each message is determined at 1520 to be a forwarded message, the score is incremented twice by 1, with the result that at the end of step 1550, the associated score for the keyword is now 2. Subsequently, for each user, their respective profiles are updated with the keywords and their new scores at 1560. It can be seen in the foregoing example that the user 50 will receive the greatest score for the keywords associated with the message, reflecting the fact that he or she had received multiple copies of the forwarded message, while the other users in this particular chain received scores of 0 or −1.

A further embodiment of this process is described with reference to FIG. 16, in which user actions and increments are detected and stored by each messaging client rather than at the server 1000 or 1050, while the server 1000 or 1050 updates profiles associating keywords with users. At 1600, the message is received, and at 1610 keywords are again determined for the message, either from the message subject line, the message body content, or both. Those keywords are stored at the server 1000 or 1050 in association with a message identifier for the message. At 1620, it is determined whether the received message was a forwarded message; as before, this may be done by scanning the subject line for a token indicative of a forwarded message. If the message was a forwarded message, then the user's profile is updated at 1630 to increment any score in the user's profile associated with those keywords, based on the aforementioned heuristics. The message is then provided to the messaging client at the client device 100 or 251, and a user action is awaited.

At 1640, a user action is detected by the messaging client, which determines and stores an increment based on that action at 1650. The increments may be the same as those set out in Table 1 above. The messaging client then transmits to the server 1000 or 1050 an update message comprising the message identifier and the increment at 1660. The update message is received at 1670 at the server 1000 or 1050, and the user profile for the keywords previously identified for the message is updated at 1670 as described above. Since the method of FIG. 16 involves detection of user action and assessment of increments at the messaging client, this method may be employed in arrangements where messages are downloaded to the client device 100, 251 but subsequent actions are not synchronized with the message server 1050.

The foregoing processes thus permit for the continual updating of subject matter expertise profiles as messages are received and propagated through the organization domain. Although these embodiments were preceded in FIGS. 11 and 12 with an initial indexing or keyword database generation procedure, it will be appreciated by those skilled in the art that the methods of any ones of FIGS. 13 through 16 may instead be implemented without this initial step. Instead, profiles associating keywords with users are developed as one of the processes of FIGS. 13 through 16 is followed for any messages received within the organization domain. The brute force method of indexing every user's message store in order to generate the initial keyword database and to subsequently update it is thereby avoided, and it is not necessary to conduct interviews or surveys to identify SMEs. Further, because the profiles for each user are continually updated based on how messages are handled within the domain, new subject matter experts who may not have been previously identified within the organization can be automatically discovered.

The foregoing embodiments have been described with reference to the identification of SMEs, and addressing of messages to those identified subject matter experts. It will be appreciated by those skilled in the art that, these embodiments may be modified to identify individuals within the organization having an interest in particular subject matter, even if they do not possess sufficient expertise to be considered a SME.

Figure 17:
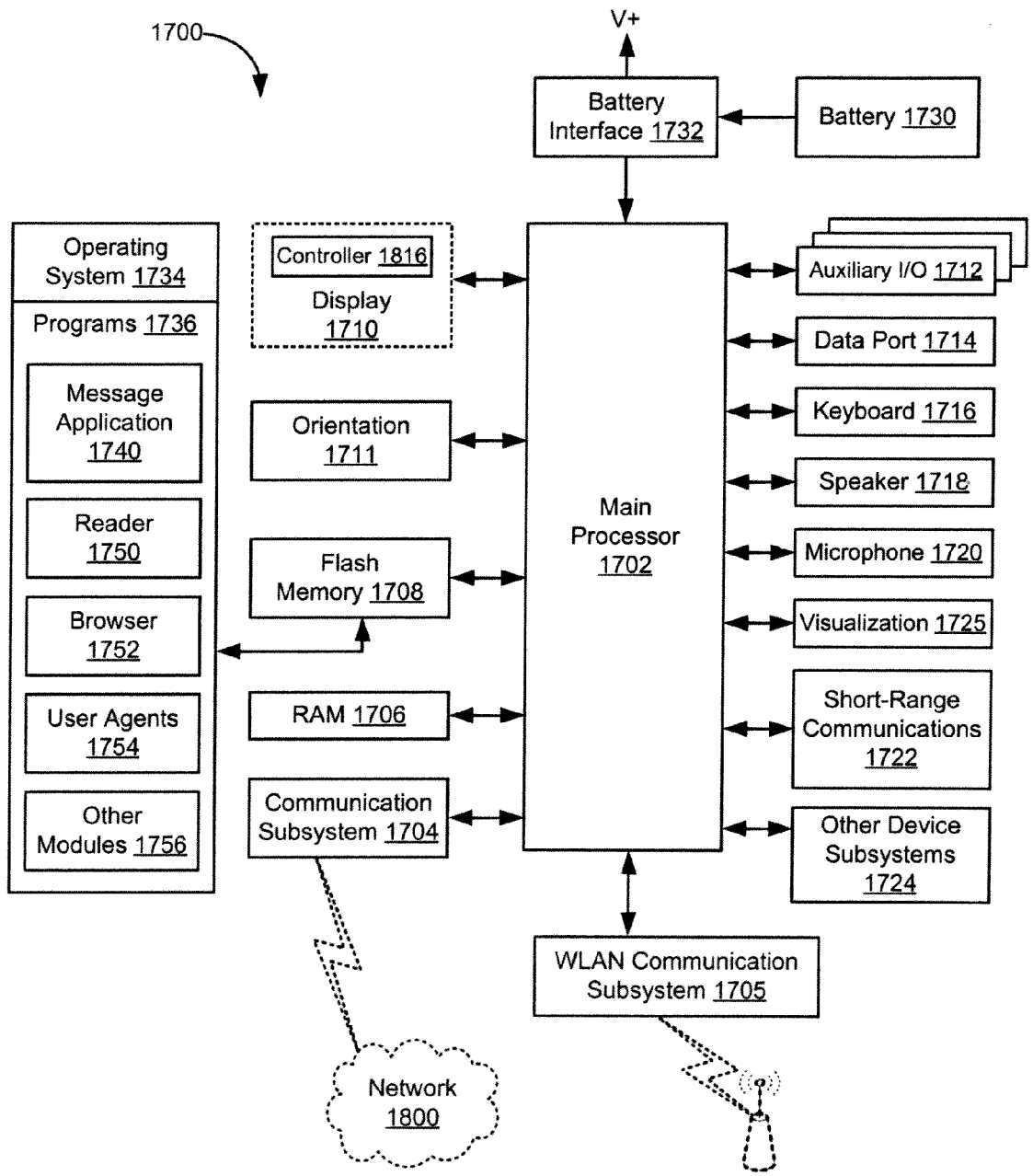
FIG. 17 is a schematic diagram of an example electronic device for use with the embodiments described herein.

FIG. 17 is a block diagram of an example embodiment of a communication or computing device (referred to as an electronic device 1700) that may be used with the embodiments described herein. The electronic device 1700 includes a number of components such as a main processor 1702 that controls the overall operation of the electronic device 1700. It should be understood that the components described in FIG. 17 are optional and that an electronic device used with various embodiments described herein may include or omit components described in relation to FIG. 17.

The electronic device 1700 may be a battery-powered device including a battery interface 1732 for receiving one or more rechargeable batteries 1730. Communication functions, including data and voice communications, are performed through one or more communication subsystems 1704, 1705, and/or 1722 in communication with the processor 1702. Data received by the electronic device 1700 can be decompressed and decrypted by decoder 1703, operating according to any suitable decompression techniques, and encryption/decryption techniques according to one or more various encryption or compression standards known to persons of skill in the art.

If equipped with a communication subsystem 1704, this subsystem 1704 receives data from and sends data to wireless network 1800. In this embodiment of the electronic device 1700, the communication subsystem 1704 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 1704 with the wireless network 1800 represents one or more different Radio Frequency (RF) channels, operating according to defined protocols specified for the wireless communications standard, and optionally other network communications.

The electronic device 1700 may be provided with other communication subsystems, such as a wireless LAN (WLAN) communication subsystem 1705 or a short-range and/or near-field communications subsystem 1722 also shown in FIG. 17. The WLAN communication subsystem 1705 may operate in accordance with a known network protocol such as one or more of the 802.11™ family of standards developed or maintained by IEEE. The communications subsystems 1705 and 1722 provide for communication between the electronic device 1700 and different systems or devices without the use of the wireless network 1800, over varying distances that may be less than the distance over which the communication subsystem 1704 can communicate with the wireless network 1800. The subsystem 1722 can include an infrared device and associated circuits and/or other components for short-range or near-field communication.

It should be understood that any of the communication subsystems 1704, 1705, 1722 may optionally be included in the electronic device 1700. Alternatively, a communication subsystem provided in a dongle or other peripheral device (not shown) may be connected to the electronic device 1700, either wirelessly or by a fixed connection such as a USB port, to provide the electronic device 1700 with access to a network. If provided onboard the electronic device 1700, the communication subsystems 1704, 1705 and 1722 may be separate from, or integrated with, each other.

The main processor 1702 also interacts with additional subsystems, if present, such as a Random Access Memory (RAM) 1706, a flash memory 1708, a display 1710, other data and memory access interfaces such as an auxiliary input/output (I/O) subsystem 1712 or a data port 1714, a keyboard 1716, a speaker 1718, a microphone 1720, the communications 1704, 1705, 1722 and other device subsystems 1724. The electronic device may also be provided with an orientation sensor or module 1711, used to detect the orientation of the display 1710. In the case of a portable (such as a handheld) electronic device 1700, display 1710 is typically integrated with the device 1700, as well as the orientation module 1711. In the case of an electronic device 1700 where the display 1710 is external to the device, the orientation module 1711 may be integrated with the external display screen. The orientation module 1711 may include any suitable module that may be selected by those skilled in the art, such as an accelerometer which may be used to detect gravity- or motion-induced forces and their direction. For example, the orientation module can have a digital three-axis accelerometer connected to an interrupt and serial interface of the processor 1702, or another microcontroller of the device 1700 (not shown). The processor 1702 or microcontroller determines the device 1700 orientation in accordance with acceleration measured by the accelerometer and provides the detected orientation to the operating system, or raw acceleration data measured by the accelerometer can be sent to the processor 1702 so that device orientation is determined by the operating system of the electronic device 1700. The orientation module 1711 may thus be considered to include the accelerometer, microcontroller or those modules of the processor 1702 executing to determine orientation. It should be understood that the orientation module 1711 may optionally be present at an external display, and provide orientation determination for the display screen associated with the electronic device 1700. Whether the orientation module 1711 is located at an external display or is located at the electronic device 1700 having an integrated display, the orientation determined by the orientation module 1711 is related to the orientation of the display screen associated with the mobile device.

The orientation or acceleration detected at the electronic device 1700 (or at the external display 1710) may be processed to determine a response of the electronic device 1700, such as an orientation of a graphical user interface displayed on the display 1710 in response to a determination of the current orientation detected. Upon determination of the current orientation or a change in orientation, the operating system may issue notifications to executing applications of the current orientation. Individual applications may register a device orientation event notification listener with the operating system to receive such notifications. Alternatively, applications may query the operating system for the current orientation at defined intervals.

In some embodiments, the electronic device 1700 may be a touchscreen-based device, in which the display interface 1710 is a touchscreen interface that provides both a display for communicating information and presenting graphical user interfaces, as well as an input subsystem for detecting user input that may be converted to instructions for execution by the device 1700. The touchscreen display interface 1710 may be the principal user interface provided on the electronic device 1700, although in some embodiments, additional buttons, variously shown in the figures or a trackpad, or other input means may be provided. If a touchscreen display interface 1710 is provided, then other user input means such as the keyboard 1716 may or may not be present. The controller 1816 and/or the processor 1702 may detect a touch by any suitable contact member on the touch-sensitive display 1710.

A visualization processor or module 1725 may be included in the electronic device 1700. The visualization module 1725 analyzes and processes data for visualization on the display 1710. Data originally prepared for visualization on a large-screen display may require additional processing prior to visualization on a small-screen display. This additional processing may be accomplished by the visualization module 1725. As will be appreciated by those of skill in the art, the visualization module can be implemented in hardware, software, or a combination thereof, and can include a dedicated image processor and associated circuitry, or can be implemented within main processor 1702.

The electronic device 1700 also includes an operating system 1734 and software components 1736 to 1752 which are described in more detail below. The operating system 1734 and the software components 1736 to 1752 that are executed by the main processor 1702 are typically stored in a persistent store such as the flash memory 1708, which can alternatively be a read-only memory (ROM) or similar storage element (not shown). Those skilled in the art will appreciate that portions of the operating system 1734 and the software components 1740 to 1752, such as specific device applications, or parts thereof, can be temporarily loaded into a volatile store such as the RAM 1706. Select other modules 1752 may also be included, such as those described herein. Other software components can also be included, as is well known to those skilled in the art.

A subset of software applications 1736 that control basic device operations may be installed on the electronic device 1700 during its manufacture. Other software applications include a message application 1740 that can be any suitable software program that allows a user of the electronic device 1700 to send and receive electronic messages. Various alternatives exist for the message application 1740 as is well known to those skilled in the art. Messages that have been sent or received by the user are typically stored in the flash memory 1708 of the electronic device 1700 or some other suitable storage element in the electronic device 1700. In at least some embodiments, some of the sent and received messages can be stored remotely from the device 1700 such as in a data store of an associated host system with which the electronic device 1700 communicates.

Other types of software applications can also be installed on the electronic device 1700, such as feed or content readers 1750, web browsers 1752, other user agents 1754, and other modules 1756. These software applications may be supplied by the electronic device manufacturer or operating system provider, or may be third party applications. The additional applications can be loaded onto the electronic device 1700 through at least one of the communications subsystems 1704, 1705, 1722, the auxiliary I/O subsystem 1712, the data port 1714, or any other suitable device subsystem 1724. This flexibility in application installation increases the functionality of the electronic device 1700 and can provide enhanced on-device functions, communication-related functions, or both.

In use, a received signal such as a text message, an e-mail message, or web page download will be processed by the receiving communication subsystem 1704, 1705, 1722 and input to the main processor 1702. The main processor 1702 will then process the received signal for output to the display 1710 or alternatively to the auxiliary I/O subsystem 1712. A subscriber can also compose data items, such as e-mail messages, for example, using the keyboard 1716 in conjunction with the display 1710 and possibly the auxiliary I/O subsystem 1712. The auxiliary subsystem 1712 can include devices such as: a touchscreen, mouse, track ball, infrared fingerprint detector, or a roller wheel with dynamic button pressing capability. The keyboard 1716 may be an alphanumeric keyboard and/or telephone-type keypad. However, other types of keyboards can also be used. A composed item can be transmitted over the wireless network 1800 through the communication subsystem 1704. It will be appreciated that if the display 1710 is a touchscreen, then the auxiliary subsystem 1712 may still include one or more of the devices identified above.

The communication subsystem component 1704 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 1704, 1705, 1722, or other communication subsystem is dependent upon the communication network 1800 with which the electronic device 1700 is intended to operate. Thus, it should be understood that the foregoing description serves only as one example.

Thus, the embodiments described herein provide a method, comprising: detecting message composition at a communication device in a message composition screen; while said message composition screen is displayed, transmitting a query comprising at least a portion of either a subject line or a body of the message; receiving a response to the query identifying at least one addressee corresponding to at least one keyword comprised in said portion; and displaying the received at least one addressee for selection for insertion into an address field of said message composition screen.

In one aspect, the method further provides inserting one or more of the at least one addressee into the address field of said message composition screen and transmitting the message.

In another aspect, the query is transmitted to a message server, and the response is received from the message server.

In still a further aspect, the method provides, for each of a plurality of messages received at a message server, each of said plurality of messages being addressed to a corresponding one of a plurality of recipients, storing a score associated with said corresponding recipient and with at least one keyword comprised in said message, the score being dependent on whether said message is a forwarded message; incrementing said stored score upon determination that a further forwarded message comprising said keyword and addressed to said corresponding recipient has been received; and in response to said transmitted query, providing said response, said at least one addressee thus identified comprising at least one of said plurality of recipients having a highest score associated with said at least one keyword comprised in said portion.

There is also provided a communication device, comprising: a display; a communications subsystem; and a processor in communication with said display and said communications subsystem, the processor being configured to: detect message composition at a communication device in a message composition screen displayed on the display; while said message composition screen is displayed, transmit via the communications subsystem a query comprising at least a portion of either a subject line or a body of the message; receive, via the communications subsystem, a response to the query identifying at least one addressee corresponding to at least one keyword comprised in said portion; and display the received at least one addressee for selection for insertion into an address field of said message composition screen.

In one aspect, the communication device is further configured to insert one or more of the at least one addressee into the address field of said message composition screen and enable transmission of the message.

There is also provided a system, comprising the foregoing a communication device and a server in communication with said communication device, the server comprising: at least one processor, the at least one processor being configured to: for each of a plurality of messages received at the server, each of said plurality of messages being addressed to a corresponding one of a plurality of recipients associated with a corresponding one of the plurality of message stores, store a score associated with said corresponding recipient and with at least one keyword comprised in said message, the score being dependent on whether said message is a forwarded message; increment said stored score upon determination that a further forwarded message comprising said keyword and addressed to said corresponding recipient has been received; receive the query from the communication device; and in response to said query, provide to the communication device said response, said at least one addressee thus identified comprising at least one of said plurality of recipients having a highest score associated with said at least one keyword comprised in said portion.

There is also provided a computer-readable or electronic device-readable medium, which may be non-transitory or physical, and which may be provided in a program product, bearing or storing code which, when executed by one or more processors of a device, cause the device to carry out the above-described methods.

In the above embodiments, the query or query keyword may comprise at least a portion of the subject line of the message; the at least one addressee may comprise either a messaging address or friendly name; the at least one addressee may comprise a plurality of addressees corresponding to a plurality of keywords comprised in said portion; and/or the at least one addressee identified in the response may comprise at least one of a plurality of recipients having a highest score associated with said at least one keyword.

Further, in the above embodiments, storing, incrementing and providing may be carried out at a message server; storing may comprise embedding said score in a header of said message, and incrementing comprises embedding the score thus incremented in said header upon determining that said message has been forwarded to a further recipient; and the embodiments may be further configured to decrement said stored score upon determination that said corresponding recipient has forwarded said message to a further recipient.

These embodiments above were described and illustrated in relation to client communication devices, such as wireless communication devices, communicating over wireless networks and public networks. It will be appreciated by those skilled in the art, however, that this description is not intended to limit the scope of the described embodiments to implementation on these particular systems or to wireless devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a client device, electronic device, computing or communication device may include any such device.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method, comprising:
   for each of a plurality of messages received at a server, each of said plurality of messages being addressed to a corresponding one of a plurality of recipients, storing a score associated with said corresponding recipient and with at least one keyword comprised in said message, the score being dependent on whether said message is a forwarded message;
   incrementing said stored score upon determination that a further forwarded message comprising said keyword and addressed to said corresponding recipient has been received;
   receiving a query sent by a communication device, the query comprising at least a portion of either a subject line or a body of a message to be sent from the communication device;
   identifying at least one addressee corresponding to at least one keyword comprised in said portion, said at least one addressee comprising at least one of said plurality of recipients having a highest score associated with said at least one keyword comprised in said portion; and
   transmitting a response comprising the identified at least one addressee to the communication device, such that the at least one addressee is available for selection at the communication device.

2. The method of claim 1, wherein the query comprises at least a portion of the subject line of the message.

3. The method of claim 1, wherein the at least one addressee comprises either a messaging address or friendly name.

4. The method of claim 1, wherein the at least one addressee comprises a plurality of addressees corresponding to a plurality of keywords comprised in said portion.

5. The method of claim 1, further comprising the communication device:
   sending the query;
   receiving the response to the query; and
   after receiving the response to the query, displaying the identified at least one addressee for selection for insertion into an address field for the message to be sent from the communication device.

6. The method of claim 1, further comprising the server receiving the message from the communication device for transmission to the identified at least one addressee.

7. The method of claim 1, wherein the query is received while the message is being composed at the communication device.

8. The method of claim 1, wherein said storing, incrementing, and identifying are carried out at the server receiving the plurality of messages.

9. The method of claim 1, wherein storing comprises embedding said score in a header of said message, and incrementing comprises embedding the score thus incremented in said header upon determining that said message has been forwarded to a further recipient.

10. The method of claim 1, further comprising decrementing said stored score upon determination that said corresponding recipient has forwarded said message to a further recipient.

11. The method of claim 1, wherein said at least one keyword comprised in said message is comprised in a subject line of said message.

12. A system comprising at least one computing device, the at least one computing device comprising:
   at least one processor, the at least one processor being configured to:
      for each of a plurality of messages received by the system, each of said plurality of messages being addressed to a corresponding one of a plurality of recipients, store in a data store of the system a score associated with said corresponding recipient and with at least one keyword comprised in said message, the score being dependent on whether said message is a forwarded message;
      increment said stored score upon determination that a further forwarded message comprising said keyword and addressed to said corresponding recipient has been received; and
      in response to a query sent by a communication device, the query comprising at least a portion of either a subject line or a body of a message to be sent from the communication device:
         identify at least one addressee corresponding to at least one keyword comprised in said portion, said at least one addressee comprising at least one of said plurality of recipients having a highest score associated with said at least one keyword comprised in said portion; and
         provide a response for the communication device the response comprising the identified at least one addressee.

13. The system of claim 12, wherein the query comprises at least a portion of the subject line of the message.

14. The system of claim 12, wherein the at least one addressee comprises a plurality of addressees corresponding to a plurality of keywords comprised in said portion.

15. A system, comprising:
   a communication device, comprising:
      a display;
      a communications subsystem; and
      a processor in communication with said display and said communications subsystem, the processor being configured to:
         detect message composition at a communication device in a message composition screen displayed on the display;

while said message composition screen is displayed, transmit via the communications subsystem a query comprising at least a portion of either a subject line or a body of the message;

receive, via the communications subsystem, a response to the query identifying at least one addressee corresponding to at least one keyword comprised in said portion; and display the received at least one addressee for selection for insertion into an address field of said message composition screen; and a server in communication with said communication device, the server comprising:

at least one processor, the at least one processor being configured to:

for each of a plurality of messages received at the server, each of said plurality of messages being addressed to a corresponding one of a plurality of recipients associated with a corresponding one of a plurality of message stores, store a score associated with said corresponding recipient and with at least one keyword comprised in said message, the score being dependent on whether said message is a forwarded message;

increment said stored score upon determination that a further forwarded message comprising said keyword and addressed to said corresponding recipient has been received;

receive the query from the communication device; and in response to said query, provide to the communication device said response, said at least one addressee thus identified comprising at least one of said plurality of recipients having a highest score associated with said at least one keyword comprised in said portion.

16. The system of claim 15, wherein the at least one processor of the server is configured to store said score by embedding said score in a header of said message, and incrementing comprises embedding the score thus incremented in said header upon determining that said message has been forwarded to a further recipient.

17. The system of claim 15, wherein the at least one processor of the server is configured to decrement said stored score upon determination that said corresponding recipient has forwarded said message to a further recipient.

18. The system of claim 15, wherein said at least one keyword comprised in said message is comprised in a subject line of said message.

* * * * *